United States Patent [19]

Cook

[11] Patent Number: 5,311,514
[45] Date of Patent: May 10, 1994

[54] DRIVER FOR BUS CIRCUIT OF MOTOR VEHICLE MULTIPLEX COMMUNICATIONS SYSTEM

[75] Inventor: Roger J. Cook, Livonia, Mich.
[73] Assignee: Ford Motor Company, Dearborn, Mich.
[21] Appl. No.: 41,367
[22] Filed: Apr. 1, 1993
[51] Int. Cl.⁵ .............................................. H04J 3/02
[52] U.S. Cl. .................... 370/85.1; 307/270; 307/350
[58] Field of Search .................... 370/85.1–112; 375/36; 178/63 R, 63 B, 63 E, 69 N, 69 R; 307/263–270, 350, 481, 443, 451, 475, 362; 323/315–317; 340/825.5, 825.03

[56] References Cited

U.S. PATENT DOCUMENTS

| | | | |
|---|---|---|---|
| 4,337,465 | 6/1982 | Spracklen et al. | 370/85.1 |
| 4,425,564 | 1/1984 | Steele | 340/825.79 |
| 4,437,021 | 3/1984 | Sumi et al. | 375/36 |
| 4,797,582 | 1/1989 | Nguyen et al. | 307/475 |
| 4,809,266 | 2/1989 | Okada | 370/85 |
| 4,890,010 | 12/1989 | Neudeck et al. | 307/270 |
| 4,929,941 | 5/1990 | Lecocq | 340/825.14 |
| 5,077,756 | 12/1991 | Christophersen | 375/36 |

Primary Examiner—Douglas W. Olms
Assistant Examiner—Ajit Patel
Attorney, Agent, or Firm—Richard D. Dixon; Roger L. May

[57] ABSTRACT

A bus driver circuit for a multiplex communications system is configured from a limited number of components to withstand short circuiting of a connected bus circuit to voltage levels from ground potential to double conventional voltage levels encountered within a motor vehicle, i.e. twenty four (24) volts. The bus driver circuit does not interfere with bus operation if local power or ground is lost by one or more system node including the circuit, and can operate at relatively high frequencies, for example of approximately 83.3 to 166.7 kilobits per second (KBPS). Each line of a two-line bus is driven by a transistor whose current flow is limited by emitter degeneration and, in the case of the transistor which sinks current from the bus, a separate current control transistor which monitors current flow through its associated bus driver transistor and reduces its base drive at high temperatures to limit current flow therethrough and compensate the circuit for temperature variations. The turn-on and turn-off edges of bus driver signals are rounded by capacitors connected across the collector-base junctions of the bus driver transistors.

20 Claims, 1 Drawing Sheet

5,311,514

DRIVER FOR BUS CIRCUIT OF MOTOR VEHICLE MULTIPLEX COMMUNICATIONS SYSTEM

BACKGROUND OF THE INVENTION

The present invention relates generally to multiplex communications systems used, for example, for motor vehicles and, more particularly, to driver circuits for connecting individual nodes of a multiplex communications system with a two wire, preferably twisted pair, communications bus which interconnects nodes of the system.

The use of multiplex communications systems in motor vehicles has been known for some time to reduce the large number of wires which are used within vehicles. In addition, such multiplex systems benefit the design, assembly and diagnostics of motor vehicles. A common component of multiplex systems is a bus circuit which interconnects nodes of a given system. Since a bus circuit typically extends throughout a motor vehicle, it can reach a substantial length and, accordingly, multiplex system buses are preferably constructed as simply as possible to reduce the costs of the multiplex system. One popular bus circuit is constructed using a twisted pair of wires which are terminated at least at one point to ground for one wire and to system signal potential for the other wire.

In the past, driver circuits for connecting individual nodes of a motor vehicle multiplex communications system to a bus circuit have been problematic. Known bus drivers often include a substantial number of components and hence can be costly and occupy a substantial amount of space. In addition, reliability has plagued some bus drivers. For example, multiplex communications systems should not be disabled if a single node loses its power or ground, the bus or one side of the bus is shorted to power or ground, or the bus or one side of the bus is shorted to reverse power. Many known bus drivers cannot survive such mishaps. In the motor vehicle environment, it is even possible for a bus driver to be subjected to double battery voltage or reversed double battery voltage by attempts to jump-start the vehicle.

Accordingly, there is a need for a low cost bus driver circuit which can reliably drive a bus circuit of a multiplex communications system of a motor vehicle. The bus driver circuit should preclude interference with other nodes communicating over the bus in the event one or more nodes each including the bus driver circuit are disabled by loss of power or ground. Preferably, such a bus driver circuit would be able to withstand bus shorts to ground, bus shorts to vehicle power, or even bus shorts to direct or reversed double vehicle power without sustaining damage.

SUMMARY OF THE INVENTION

This need is met by the bus driver circuit of the present invention which utilizes a limited number of components to construct a compact, inexpensive circuit which can withstand the short circuiting of a connected bus circuit to voltage levels from ground potential to double conventional voltage levels encountered within a motor vehicle, i.e. twenty four (24) volts. The driver circuit does not effect bus operation if local power or ground is lost by a system node including the circuit, and the bus driver circuit can operate at relatively high frequencies, for example of approximately 83.3 to 166.7 kilobits per second (KBPS).

Each line of a two-line bus is driven by a transistor whose current flow is limited by emitter degeneration and, in the case of the transistor which sinks current from the bus, a separate current control transistor which monitors current flow through its associated bus driver transistor and reduces its base drive to limit current flow therethrough. The separate current control transistor also performs temperature compensation for the bus driver circuit since it conducts more base drive current from its associated bus driver transistor for higher ambient temperatures.

The turn-on and turn-off edges of bus driver signals are rounded by capacitors connected across the collector-base junctions of the bus driver transistors. The capacitors also reduce the effect of mismatches between the bus driver transistors.

In accordance with one aspect of the present invention, a circuit drives a two wire bus for a multiplex communication system in a motor vehicle wherein the bus has a first wire which is terminated to vehicle ground potential through at least one resistor and a second wire which is terminated to bus signal potential through at least one resistor. The circuit comprises a first transistor having a control terminal, a current input terminal and a current output terminal. Current limiting means is coupled to the first transistor for limiting maximum current flow in the first transistor from its current input terminal to its current output terminal. First switch time control means is coupled to the first transistor for slowing turn-on and turn-off of the first transistor. First transistor control means is coupled to the control terminal of the first transistor for providing turn-on and turn-off signals to the control terminal of the first transistor. First base drive control means is coupled to the control terminal of the first transistor for preventing turn-on of the first transistor in the absence of turn-on signals from the first transistor control means. First diode means couples the current output terminal of the first transistor to the first wire of the bus. A second transistor having a control terminal, a current input terminal and a current output terminal provides for driving the second wire of the bus. Dual control current limiting means is coupled to the second transistor for limiting maximum current flow in the second transistor from the current input terminal to the current output terminal. Dual control is provided because of the potentially high current which can be drawn by the second transistor. Second switch time control means is coupled to the second transistor for slowing turn-on and turn-off of the second transistor. Second transistor control means is coupled to the control terminal of the second transistor for providing turn-on and turn-off signals to the control terminal of the second transistor. Second base drive control means is coupled to the control terminal of the second transistor for preventing turn-on of the second transistor in the absence of turn-on signals from the second transistor control means. Second diode means couple the current input terminal of the second transistor to the second wire of the bus. High voltage transient suppression means and radio frequency suppression means are coupled to the first and second wires of the bus.

It is a feature of the present invention to provide an improved bus driver circuit for a multiplex communications system for a motor vehicle which driver circuit is constructed of a limited number of components yet reliably drives a bus circuit without interfering with bus operation in the event of ground or power interruptions at one or more nodes each including a bus driver circuit; to provide an improved bus driver circuit wherein bipolar transistors are connected to drive the bus circuit with current through the transistors being limited to prevent destruction of the transistors in the event of short circuits of the bus to voltages ranging from ground potential to twice the battery voltage of the vehicle; and, to provide an improved bus driver circuit wherein turn-on and turn-off of transistors used to drive the bus is limited by capacitors connected across base collector junctions of bipolar transistors used to drive the bus.

Other features and advantages of the invention will be apparent from the following description, the accompanying drawings and the appended claims.

DETAILED DESCRIPTION OF THE INVENTION

Figure 1:
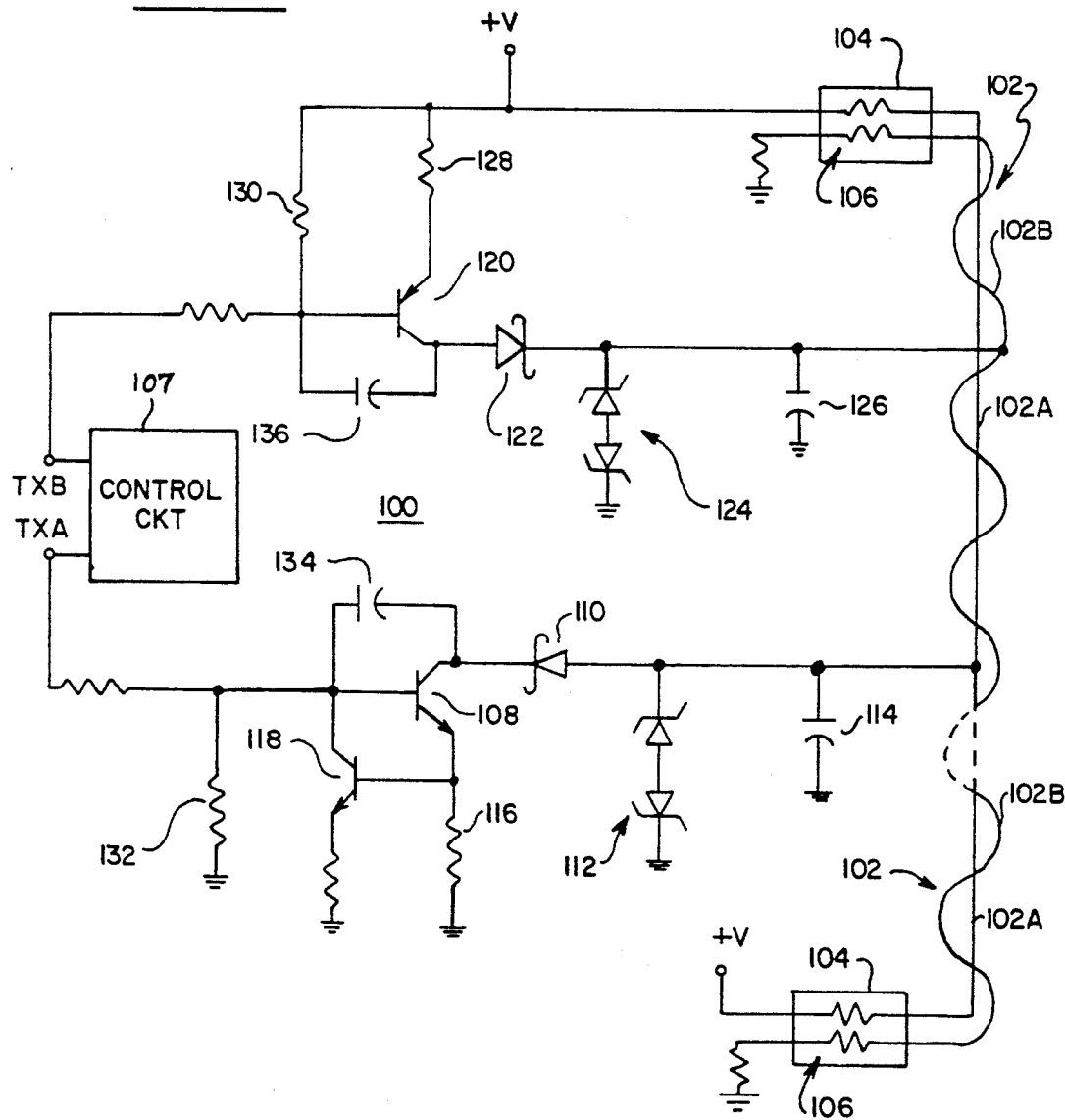
FIG. 1 is a schematic diagram of a circuit for driving a two wire bus circuit.

A bus driver circuit 100 of the present application is illustrated in schematic diagram form in FIG. 1. The driver circuit 100 is illustrated as driving a communications bus 102 comprising a twisted pair of wires which are terminated at least at one point to ground potential for one wire and to communications system signal potential +V for the other. The bus 102 is connected to the ground potential and the system signal potential +V through termination blocks 104 which each include a pair of resistors 106. One wire 102A of the bus 102 is terminated to system signal potential +V and is driven in response to a data signal TXA while the other wire 102B of the bus 102 is terminated to ground and is driven in response to a data signal TXB. The data signals TXA and TXB are opposite polarity signals which drive the two wires 102A and 102B of the bus 102 to opposite states, active and passive. The data signals TXA and TXB are generated in a conventional manner by first transistor control means and second transistor control means included within a control circuit 107 which controls the bus driver circuit 100 to drive the bus 102.

Various data string formats have been used in the past to transfer information between nodes of multiplex communications systems. Commonly assigned U.S. Pat. No. 4,792,950 which issued to Volk et al and is hereby incorporated by reference, discloses a data signal which uses a pulse width modulated (PWM) format. In this PWM format, each data bit is divided into three subbits of equal duration. For example, a bit of twelve microseconds is comprised of three four microsecond subbits. A logic zero (0) data bit is defined by two initial subbits at a high voltage level followed by one subbit at a low voltage level. Conversely, a logic one (1) data bit is comprised of one high voltage level subbit followed by two low voltage level subbits. Use of this format in multiplex communications system results in an average duty cycle of approximately 45%.

The data signal TXA controls a first bus driver transistor 108 which inverts the data signal TXA and applies it to the wire 102A of the bus 102 through a Schottky diode 110. The wire 102A of the bus 102 is also connected to a pair of series connected zener diodes 112 which protects the driver circuit 100 from high transient voltages exceeding approximately forty-five (45) volts and a capacitor 114 which bypasses high frequency noise from the wire 102A to ground potential.

Since the first bus driver transistor 108 sinks current from the bus 102 to ground, current flow through the transistor 108 must be limited in the event the bus 102 and particularly the wire 102A of the bus 102 is shorted to positive vehicle operating potential (+12 volts) or even to double positive vehicle operating potential (+24 volts) which can be encountered during attempts to jump-start a vehicle including the bus driver circuit 100. Current limiting for the transistor 108 is threefold. Initially, the transistor 108 is selected to having decreasing gain at high current levels and to be packaged in a high power dissipation package. For example a one-and-a-half (1½) watt SOT-223, PZT3904 bipolar npn transistor is currently preferred for the transistor 108.

Current flow through the transistor 108 is also limited by a resistor 116 which performs emitter degeneration for the transistor 108. Since current is free to flow to the transistor 108 from the wire 102A of the bus 102 because of the poling of the Schottky diode 110, additional current limiting is performed by a separate current control npn bipolar transistor 118 which is connected to steal base drive current from the transistor 108. The separate current control transistor 118 also performs temperature compensation for the bus driver circuit 100 since the base-emitter voltage required for its conduction decreases approximately 2 mv/° C. Accordingly, it steals more base drive current from the transistor 108 for higher ambient temperatures to further restrict current flow through the transistor 108 for higher ambient temperatures.

The data signal TXB controls a second bus driver transistor 120 which inverts the data signal TXB and applies it to the wire 102B of the bus 102 through a Schottky diode 122. The wire 102B of the bus 102 is also connected to a pair of series connected zener diodes 124 which protects the driver circuit 100 from high transient voltages exceeding approximately forty-five (45) volts and a capacitor 126 which bypasses high frequency noise from the wire 102B to ground potential.

Current flow through the transistor 120 must be limited in the event the bus 102 and particularly the wire 1022B of the bus 102 is shorted to ground potential. If the wire 102B of the bus 102 is shorted to operating potential (+12 volts) or even to double vehicle operating potential (+24 volts), the transistor 120 and hence the driver circuit 110 are protected by the Schottky diode 122 which is reverse biased for such conditions. Current limiting for the transistor 120 is twofold and, to some extent, threefold as with the transistor 108. Initially, the transistor 120 is selected to have decreasing gain at high current levels and is packaged in a high power dissipation package. For example a one-and-a-half (1½) watt SOT-223, PZT3906 bipolar pnp transistor is currently preferred for the transistor 120.

Current flow through the transistor 120 is also limited by a resistor 128 which performs emitter degeneration for the transistor 120. A small amount of current limiting is also provided by a resistor 130 since current through the resistor 130 increases with increasing current flow through the transistor 120 and thereby reduces the base drive for the transistor 120. However, the primary reason for the resistor 130 is to prevent the transistor 120 from turning on if the input is open circuited or otherwise goes to a high impedance level. A resistor 132 serves a similar function for the transistor 108.

Switch time control means comprising capacitors 134, 136 round the turn-on and turn-off edges of bus driver signals produced by the transistors 108, 120. The connections of the capacitors 134, 136 take advantage of the Miller effect to effectively increase their capacitance values. Accordingly, the capacitors 134, 136 reduce radiated emissions from the bus driver circuit 100.

The capacitors 134, 136 also reduce the effect of mismatches between the bus driver transistors 108, 120. Thus, the capacitors 134, 136 reduce the radiated emissions generated by the bus driver circuit 100 which can result, for example, if the turn-off times of the transistors 108, 120 are mismatched.

The Schottky diodes 110, 122 protect the bus driver circuit 100 and provide symmetry for driving the bus 102 while reducing the output level of bus signals by less than 0.4 volts. The Schottky diodes 110, 122 and the collector base junction of the transistor 108 also reduce the effective system bus capacitance by substantially isolating bus driver capacitance for nodes which are not trying to transmit. This isolation is important for large multiplex communications systems having from sixteen (16) to thirty two (32) nodes where all nodes do not try to transmit simultaneously. Isolation is also important for smaller systems which operate at high speed from 83.3 to 166.7 KBPS.

It should be apparent that a high reliable bus driver circuit has been disclosed which can survive short circuits of a connected bus circuit to ground potential up to double vehicle operating potential without being disabled. The bus driver circuit prevents disabling of a bus circuit for loss of power or ground for one or a number of nodes connected to the bus. Thus, reliability and speed are enhanced by use of the bus driver circuit of the present invention.

Having thus described the invention of the present application in detail and by reference to preferred embodiments thereof, it will be apparent that modifications and variations are possible without departing from the scope of the invention defined in the appended claims.

What is claimed is:

1. A circuit for driving a two wire bus for a multiplex communication system in a motor vehicle, said bus having a first wire which is terminated to vehicle ground potential through at least one resistor and a second wire which is terminated to bus signal potential through at least one resistor, said circuit comprising:
   a first transistor having a control terminal, a current input terminal and a current output terminal;
   current limiting means coupled to said first transistor for limiting maximum current flow in said first transistor from said current input terminal to said current output terminal;
   first switch time control means coupled to said first transistor for slowing turn-on and turn-off of said first transistor;
   first transistor control means coupled to said control terminal of said first transistor for providing turn-on and turn-off signals to said control terminal of said first transistor;
   first base drive control means coupled to said control terminal of said first transistor for preventing turn-on of said first transistor in the absence of turn-on signals from said first transistor control means;
   first diode means for coupling said current output terminal of said first transistor to said first wire of said bus;
   a second transistor having a control terminal, a current input terminal and a current output terminal;
   dual control current limiting means coupled to said second transistor for limiting maximum current flow in said second transistor from said current input terminal to said current output terminal;
   second switch time control means coupled to said second transistor for slowing turn-on and turn-off of said second transistor;
   second transistor control means coupled to said control terminal of said second transistor for providing turn-on and turn-off signals to said control terminal of said second transistor;
   second base drive control means coupled to said control terminal of said second transistor for preventing turn-on of said second transistor in the absence of turn-on signals from said second transistor control means;
   second diode means for coupling said current input terminal of said second transistor to said second wire of said bus;
   high voltage transient suppression means coupled to said first and second wires of said bus for protecting said circuit from high voltage transients; and
   radio frequency suppression means coupled to said first and second wires of said bus for bypassing high frequency noise to ground potential.

2. A circuit for driving a two wire bus for a multiplex communication system in a motor vehicle as claimed in claim 1 wherein said first transistor comprises a pnp bipolar transistor in which said control terminal comprises a base, said current input terminal comprises an emitter and said current output terminal comprises a collector, and said second transistor comprises an npn bipolar transistor in which said control terminal comprises a base, said current input terminal comprises a collector and said current output terminal comprises an emitter.

3. A circuit for driving a two wire bus for a multiplex communication system in a motor vehicle as claimed in claim 2 wherein said current limiting means comprises a first current limiting resistor connected in series with said emitter of said first transistor.

4. A circuit for driving a two wire bus for a multiplex communication system in a motor vehicle as claimed in claim 3 wherein said dual control current limiting means comprises a second current limiting resistor connected in series with said emitter of said second transistor.

5. A circuit for driving a two wire bus for a multiplex communication system in a motor vehicle as claimed in claim 4 wherein said dual control current limiting means further comprises a current control npn bipolar transistor having a base connected to said second current limiting resistor, a collector connected to said base of said second transistor and an emitter, and a resistor connected between emitter of said current control npn bipolar transistor and circuit ground.

6. A circuit for driving a two wire bus for a multiplex communication system in a motor vehicle as claimed in claim 2 wherein said first switch time control means coupled to said first transistor comprises a capacitor connected between said base and said collector of said first transistor.

7. A circuit for driving a two wire bus for a multiplex communication system in a motor vehicle as claimed in claim wherein said second switch time control means coupled to said second transistor comprises a capacitor connected between said base and said collector of said second transistor.

8. A circuit for driving a two wire bus for a multiplex communication system in a motor vehicle as claimed in claim 7 wherein said first base drive control means comprises a resistor connected from circuit power to said base of said first transistor.

9. A circuit for driving a two wire bus for a multiplex communication system in a motor vehicle as claimed in claim 8 wherein said second base drive control means comprises a resistor connected from circuit ground to said base of said second transistor.

10. A circuit for driving a two wire bus for a multiplex communication system in a motor vehicle as claimed in claim 9 wherein said first diode means comprises a Schottky diode connected to conduct current from said current output terminal to said first wire of said bus.

11. A circuit for driving a two wire bus for a multiplex communication system in a motor vehicle as claimed in claim 10 wherein said second diode means comprises a Schottky diode connected to conduct current from said second wire of said bus to said current input terminal of said second transistor.

12. A circuit for driving one wire of a two wire bus for a multiplex communication system in a motor vehicle, said one wire of said bus being terminated to vehicle ground potential through at least one resistor, said circuit comprising:
a transistor having a control terminal, a current input terminal and a current output terminal;
current limiting means coupled to said transistor for limiting maximum current flow in said transistor from said current input terminal to said current output terminal;
switch time control means coupled to said transistor for slowing turn-on and turn-off of said transistor;
transistor control means coupled to said control terminal of said transistor for providing turn-on and turn-off signals to said control terminal of said transistor;
base drive control means coupled to said control terminal of said transistor for preventing turn-on of said transistor in the absence of turn-on signals from said transistor control means;
diode means for coupling said current output terminal of said transistor to said one wire of said bus;
high voltage transient suppression means coupled to said one wire of said bus for protecting said circuit from high voltage transients; and
radio frequency suppression means coupled to said one wire of said bus for bypassing high frequency noise to ground potential.

13. A circuit for driving one wire of a two wire bus for a multiplex communications system in a motor vehicle as claimed in claim 12 wherein said transistor comprises a pnp bipolar transistor in which said control terminal comprises a base, said current input terminal comprises an emitter and said current output terminal comprises a collector.

14. A circuit for driving one wire of a two wire bus for a multiplex communication system in a motor vehicle as claimed in claim 13 wherein said current limiting means comprises a current limiting resistor connected in series with said emitter of said transistor.

15. A circuit for driving one wire of a two wire bus for a multiplex communications system in a motor vehicle as claimed in claim 14 wherein said switch time control means comprises a capacitor connected between said base and said collector of said transistor.

16. A circuit for driving one wire of a two wire bus for a multiplex communication system in a motor vehicle as claimed in claim 15 wherein said base drive control means comprises a resistor connected from circuit power to said base of said transistor.

17. A circuit for driving one wire of a two wire bus for a multiplex communication system in a motor vehicle, said one wire of said bus being terminated to bus signal potential through at least one resistor, said circuit comprising:
a transistor having a control terminal, a current input terminal and a current output terminal;
dual control current limiting means coupled to said transistor for limiting maximum current flow in said transistor from said current input terminal to said current output terminal;
switch time control means coupled to said transistor for slowing turn-on and turn-off of said transistor;
transistor control means coupled to said control terminal of said transistor for providing turn-on and turn-off signals to said control terminal of said transistor;
base drive control means coupled to said control terminal of said transistor for preventing turn-on of said transistor in the absence of turn-on signals from said transistor control means;
diode means for coupling said current input terminal of said transistor to said one wire of said bus;
high voltage transient suppression means coupled to said one wire of said bus for protecting said circuit from high voltage transients; and
radio frequency suppression means coupled to said one wire of said bus for bypassing high frequency noise to ground potential.

18. A circuit for driving one wire of a two wire bus for a multiplex communication system in a motor vehicle as claimed in claim 17 wherein said transistor comprises an npn bipolar transistor in which said control terminal comprises a base said current input terminal comprises an emitter and said current output terminal comprises a collector.

19. A circuit for driving one wire of a two wire bus for a multiplex communication system in a motor vehicle as claimed in claim 18 wherein said dual control current limiting comprises a current limiting resistor connected in series with said emitter of said transistor.

20. A circuit for driving one wire of a two wire bus for a multiplex communication system in a motor vehicle as claimed in claim 19 wherein said dual control current limiting means further comprises a current control npn bipolar transistor having a base connected to said current limiting resistor, a collector connected to said base of said transistor and an emitter, and a resistor connected between said emitter of said current control npn bipolar transistor and circuit ground.

* * * * *